United States Patent
Ribeiro

(10) Patent No.: US 8,298,331 B2
(45) Date of Patent: Oct. 30, 2012

(54) ZEOLITE AND WATER SLURRIES FOR ASPHALT CONCRETE PAVEMENT

(75) Inventor: Flavio Ernesto Ribeiro, Plainfield, IL (US)

(73) Assignee: PQ Corporation, Malvern, PA (US)

( * ) Notice: Subject to any disclaimer, the term of this patent is extended or adjusted under 35 U.S.C. 154(b) by 0 days.

(21) Appl. No.: 13/349,778

(22) Filed: Jan. 13, 2012

(65) Prior Publication Data
US 2012/0180702 A1    Jul. 19, 2012

Related U.S. Application Data

(60) Provisional application No. 61/432,666, filed on Jan. 14, 2011.

(51) Int. Cl.
*C01B 39/00* (2006.01)
*C01B 39/02* (2006.01)
*C04B 14/04* (2006.01)

(52) U.S. Cl. .................. 106/287.17; 106/483; 106/792; 106/793; 106/813; 423/700

(58) Field of Classification Search ............ 106/287.17, 106/483, 813, 792, 793; 423/700
See application file for complete search history.

(56) References Cited

U.S. PATENT DOCUMENTS

| | | | | |
|---|---|---|---|---|
| 3,594,331 | A * | 7/1971 | Elliott, Jr. | 502/60 |
| 7,448,450 | B2 * | 11/2008 | Luke et al. | 166/293 |
| 7,540,904 | B2 * | 6/2009 | Hoke et al. | 96/108 |
| 2005/0076810 | A1 | 4/2005 | Barthel et al. | |
| 2006/0025312 | A1 | 2/2006 | Santra et al. | |
| 2006/0065399 | A1 | 3/2006 | Luke et al. | |
| 2007/0029088 | A1 | 2/2007 | Di Lullo Arias et al. | |
| 2009/0137705 | A1 | 5/2009 | Faucon Dumont et al. | |
| 2009/0194002 | A1 | 8/2009 | Maldonado et al. | |
| 2010/0187181 | A1 | 7/2010 | Sortwell | |
| 2010/0319577 | A1 | 12/2010 | Naidoo et al. | |

OTHER PUBLICATIONS

International Search Report for PCT/US12/21174 dated May 8, 2012 (Form PCT/ISA/210).
Written Opinion of the International Searching Authority dated May 8, 2012 (Form PCT/ISA/237).

* cited by examiner

*Primary Examiner* — Anthony J Green
(74) *Attorney, Agent, or Firm* — Buchanan Ingersoll & Rooney PC

(57) ABSTRACT

Embodiments provide slurries of water and zeolite. These slurries have beneficial properties when mixed with asphalt. These beneficial properties may include extension of the asphalt as well as a decrease in the temperature used to process the cement. In some embodiments additional additives are included, such as anti-strip amines. Methods of making and using the slurries, as well as cement mixtures incorporating the slurries are also included herein.

20 Claims, 4 Drawing Sheets

ZEOLITE AND WATER SLURRIES FOR ASPHALT CONCRETE PAVEMENT

CROSS-REFERENCE TO RELATED APPLICATIONS

This application claims priority to U.S. Provisional Patent Application No. 61/432,666, filed on Jan. 14, 2011. That application is incorporated by reference herein.

BACKGROUND OF THE INVENTION

1. Field of the Invention

Embodiments of the invention relate to the field of asphalt concrete pavement production and include slurries of water and zeolite. These slurries have beneficial properties when mixed with asphalt cement. Methods of making and using the slurries, as well as asphalt cement mixtures incorporating the slurries are also included herein.

2. Description of the Related Art

Asphalt cement, also known as bitumen, mastic, or asphalt binder, is made up primarily of high molecular weight aliphatic hydrocarbon compounds, but also small concentrations of other materials such as sulfur, nitrogen, and polycyclic hydrocarbons (aromatic and/or naphthenic) of very low chemical reactivity. Asphalt cement is a combination of asphaltenes and maltenes. Maltenes are typically present as resins and oils. Asphaltenes are more viscous than either resins or oils and play a major role in determining asphalt viscosity. Oxidation of aged asphalt causes the oils to convert to resins and the resins to convert to asphaltenes, resulting in age hardening and a higher viscosity binder. In U.S. and Polish terminology, asphalt (or asphalt cement) is the carefully refined residue from the distillation process of selected crude oils. Outside these countries, the product is often called bitumen.

The largest use of asphalt cement is for making asphalt concrete pavement for road surfaces. This accounts for approximately 85% of the asphalt consumed in the United States. Asphalt concrete pavement material is commonly composed of 5 percent asphalt cement and 95 percent aggregates (stone, sand, and gravel). Due to its highly viscous nature, asphalt cement must be heated so that it can be mixed with the aggregates at the asphalt mixing plant. For simplification of the terminology asphalt concrete pavement will be denominated "asphalt mix" from here.

One drawback to using asphalt mix is the high energy cost associated with reaching temperatures that improve handling and placement on road surfaces. Typically, asphalt mix may need to be produced at temperature as high as 160° C. for effective paving. Paving operation includes the storage of asphalt mix in the plant silos, the transport of the asphalt mix to the job site, the handling of the asphalt mix out of the trucks and into the paving equipment, the placement of the asphalt mix in the road surface with adequate compaction and specified densities. During all this process the asphalt mix needs to keep good workability thus requiring heating at higher temperatures. For special asphalt mixes like rubber asphalt higher temperatures of 170 to 180° C. are required.

There are some options available to allow a reduction in the production temperatures and they are known as Warm Mix Asphalt (WMA). Warm Mix Asphalt is the generic term for a variety of technologies that allow the producers of asphalt mix pavement materials to lower the temperatures at which the material is produced and placed on the road, without compromising the workability required to execute the paving job.

There are a number of technologies available today for Warm Mix Asphalt and generically the technologies can be divided into three categories: chemical additives, synthetic zeolites, and water foaming mechanical systems.

Chemical additives including Fisher Tropsch wax or chemical packages that may or may not contain emulsion technology can be employed to allow a reduction in temperatures. These may reduce asphalt mix production temperature to as low as 110° C. These chemical additives either change asphalt cement properties or allow a better dispersion of asphalt cement into the mix.

SASOBIT®, a product of Sasol International, is one well-known additive. It is a Fisher Tropsch wax with a longer chain than a typical paraffin wax. It can be pre-blended with the asphalt cement at the terminal, or added as small beads at the asphalt mix plant. The wax works by reducing the overall viscosity of the mix. It may cause an increase in the PG grade of the mix, a factor which may have to be taken into consideration in the mix design. The term PG grade stands for "performance grading" and is reported using two numbers—the first being the expected average seven-day maximum pavement temperature (° C.) and the second being the expected minimum pavement design temperature likely to be experienced (° C.). Thus, a PG 58-22 is intended for use where the expected average seven-day maximum pavement temperature is 58° C. and the expected minimum pavement temperature is −22° C. Notice that these numbers are pavement temperatures and not air temperatures.

Another well-known chemical additive is EVOTHERM®, a product of MeadWestvaco Asphalt Innovations. It is an emulsion technology, in varying forms, which needs a customized chemical package for each type of mix. It can be pre-blended with the asphalt cement at the terminal, or added as liquid at the asphalt mix plant, mixing with the asphalt cement.

Synthetic zeolites are able to promote time released micro bubbles foaming when added to the asphalt mix. ADVERA® WMA, a product from PQ Corporation, is a hydrated zeolite sodium A powder composed of around 78% zeolite and 22% water. Zeolite is used in asphalt production as a water release agent to induce a controlled and efficient foaming process that aids in the workability of the asphalt mix and allows effective coating of the aggregate to take place at lower production temperatures. Like chemical additives and chemical packages, the addition of synthetic zeolites like ADVERA® WMA also allows a reduction in the asphalt mix production temperature to as low as 110° C.

Water foaming mechanical systems is a technology promoted mostly by the asphalt industry equipment suppliers (including, for example Astec, Gencor, Terex, Maxam, Meeker, Stansteel, Reliable). The water is injected into the asphalt cement feed line to the asphalt mix production drum and upon contacting the hot asphalt cement all water converts to steam bubbles with approximately 20 mesh to ⅛" diameter which increased volume by a factor of 18 times. There will be a significant volumetric increase of the asphalt cement at this stage. Because the large bubbles travel fast through the asphalt mix the workability improvement does not stay for a longer length of time so the reduction of asphalt production temperatures are not as low as the ones observed with the chemical additives, chemical packages or synthetic zeolites. Typically the water foaming technologies allow a reduction of asphalt mix production temperatures to as low as 135° C.

Typically the chemicals additives and chemical packages are added on a weigh percent rate of asphalt cement varying from 0.5% up to 7%. The rate of addition depends on the type of chemical additive or chemical package being used. In general terms the chemical additives or chemical packages add an extra $2 to $4 per ton of asphalt mix in variable cost. The reduction of production temperatures to 110° C. allow savings on energy (fuel) required to dry the aggregates of about $0.4 to $0.5 per ton of asphalt, depending on the type and cost of fuel being used.

In some embodiments synthetic zeolites are added on a weigh percent rate of asphalt mix varying from 1.3 up to 2.8 Kg per Ton of Mix. In general terms the synthetic zeolite add an extra $1 to $2 per ton of asphalt mix in variable cost. The reduction of production temperatures to 110° C. allow savings on energy (fuel) required to dry the aggregates of about $0.4 to $0.5 per ton of asphalt, depending on the type and cost of fuel being used.

Typically foaming water is added on a weigh percent rate of asphalt cement varying from 1% up to 3%. Water does not add any extra cost per ton of asphalt mix in variable cost. The reduction of production temperatures to 135° C. allow a saving on energy (fuel) required to dry the aggregates of about $0.2 to $0.3 per ton of asphalt, depending on the type and cost of fuel being used.

The extra variable cost of the chemical additives, chemical packages or synthetic zeolites can be offset by the improvements on the asphalt mix. One major notorious improvement is in the workability of the mix allowing the increase of RAP (reclaimed asphalt pavement) or RAS (recycled asphalt shingles) into Warm Mix Asphalt mixes when compared to Hot Mix Asphalt Mixes. Because RAP and RAS carries bitumen on their composition an increase in weight percentage of their use into the asphalt mix will decrease the amount of fresh asphalt cement used, with considerable saving on variable cost. Typically for every 10% increase in the use of RAP the variable cost benefit is in the order of $2 to $3 per ton of asphalt mix. For every 1% increase in the use of RAS the variable cost benefit is in the order of $1.0 to $1.5 per ton of asphalt mix.

Water foaming mechanical systems raise some considerations that may complicate their use:
Brownian Motion laws of physics show that the large bubbles may travel rapidly out of the mix;
If sand or other fines are used in the mix, they can potentially act as an anti-foam and eventually break more of the remaining bubbles;
Foaming (bubbles) provide the improved workability of the mix but it could possibly decline as the bubbles travel out of the mix;
Foaming (bubbles) are not time released therefore with long hauls the workability of the asphalt mix may be reduced as bubbles coalesce and travel out of the mix;
May limit low end asphalt mix production temperature when compared to chemical additives, chemical packages or synthetic zeolites;
May not allow as much an increase of RAP or RAS compared to the chemical additives, chemical packages or synthetic zeolites due to increased stiffness of the mix;

Zeolites are microporous crystalline solids with well-defined structures. Generally they contain silicon, aluminum and oxygen in their framework and cations (such as $Na^+$, $K^+$, $Ca^{2+}$, $Mg^{2+}$ and others), water and/or other molecules within their pores. These positive ions are rather loosely held and can readily be exchanged for others in a contact solution. Many occur naturally as minerals, and are extensively mined in many parts of the world. Others are synthetic, and are made commercially for specific uses. An example mineral formula is: $Na_2Al_2Si_3O_{10}$-$2H_2O$, the formula for natrolite. Naturally-occurring mineral zeolites include amicite, analcime, barrerite, bellbergite, bikitaite, boggsite, brewsterite, chabazite, clinoptilolite, cowlesite, dachiardite, edingtonite, epistilbite, erionite, faujasite, ferrierite, garronite, gismondine, gmelinite, gobbinsite, gonnardite, goosecreekite, harmotome, herschelite, heulandite, laumontite, levyne, maricopaite, mazzite, merlinoite, mesolite, montesommaite, mordenite, natrolite, offretite, paranatrolite, paulingite, pentasil (also known as zsm-5), perlialite, phillipsite, pollucite, scolecite, sodium dachiardite, stellerite, stilbite, tetranatrolite, thomsonite, tschernichite, wairakite, wellsite, willhendersonite, and yugawaralite.

There are several types of synthetic zeolites that form by a process of slow crystallization of a silica-alumina gel in the presence of alkalis and organic templates. The product properties depend on reaction mixture composition, pH of the system, operating temperature, pre-reaction 'seeding' time, reaction time as well as the templates used. Preparation of synthetic zeolites suitable for use in embodiments of the invention is shown, for example, in U.S. Pat. No. 4,661,334, to Latounnette, et al. ("Preparation of Zeolites 4A and/or 13X"); U.S. Pat. No. 4,649,036 to Pastorello, et al. ("Process for the Manufacture of Zeolites 4A . . . "); U.S. Pat. No. 5,487,882 to Hu, et al. ("Process for Preparation of Zeolite 'X'"); U.S. Pat. No. 6,258,768, to Araya ("Zeolite P . . . "); and U.S. Pat. No. 4,264,562, to Kostinko ("Method of Producing Zeolite Y").

Synthetic zeolites hold some key advantages over their natural analogs. The synthetics can, of course, be manufactured in a uniform, phase-pure state. It is also possible to manufacture desirable zeolite structures which do not appear in nature. Zeolite A is a well-known example. Examples of synthetic zeolites are the A, P, X and/or Y types. One example of a type A zeolite has the chemical formula $Na_2O:2SiO_2$:$Al_2O_3$:$3.94H_2O$, wherein the quantity of $Na_2O$ is 17%, $Al_2O_3$ is 29%, $SiO_2$ is 34% and $H_2O$ is 20%. U.S. Pat. No. 4,264,562, to Kostinko gives a description of different synthetic zeolite types.

The general formula for zeolites can be expressed by $Na_2O:\chi SiO_2:Al_2O_3:\gamma H_2O$. Zeolite X will have $\chi=2.5\pm0.5$, Zeolite A will have $\chi=1.85\pm0.5$, Zeolite Y will have $\chi=4.5\pm1.5$. U.S. Pat. No. 6,258,768 (Arraya) describes the typical formula for Zeolite P where $\chi$ will vary from 1.80 up to 2.66. The water content on the structure, represented by $\gamma$ is variable and can reach up to 9. Typical values of $\gamma$ for Zeolite X are 6.2 and Zeolite A is 3.91. In some embodiments the value of $\gamma$ is in a range of 3 to 9 for synthetic grades. Natural grades are typically 2. For example, natrolite has the formula of $Na_2Al_2Si_3O_{10}.2H_2O$. One skilled in the art will recognize that the different water retention for the different zeolites will affect the amount of zeolite that is useful in processes according to the invention.

BRIEF SUMMARY OF THE INVENTION

Embodiments provide a slurry of water and zeolite. The slurry provides water and zeolite in a single product. In some embodiments the amount of water that may be added is offset by the addition of an anti-strip composition, preferably an anti-strip amine. A slurry is a combination of powder zeolite and water (and/or additives)

Embodiments presented herein may further reduce the mix temperature necessary for asphalt production, with economic benefits on fuel cost savings.

Embodiments presented herein may provide an enhanced ease of workability, compaction of the asphalt mix and ability to transport long hauls effectively, with economic benefits on paving performance related bonuses.

Embodiments presented herein may allow the increase of RAP and RAS in the asphalt mix, with economic benefits on fresh asphalt cement reduction in the asphalt mix Embodiments presented herein may allow the paving in a variety of adverse weather conditions such as: cold weather, altitude or mountains, low or high air humidity environments, with economic benefits on extended paving seasons.

Embodiments presented herein may allow a small reduction of the asphalt cement in the asphalt mix while maintaining key performance properties, with economic benefits on asphalt mix variable cost.

Of course, no single embodiment of the invention is required to possess all of these elements, and the extent of the invention will be governed by the claims. This may lead to potentially significant advantages, as are set forth more fully below.

DETAILED DESCRIPTION OF THE FIGURES

DETAILED DESCRIPTION OF THE INVENTION

Figure 1:
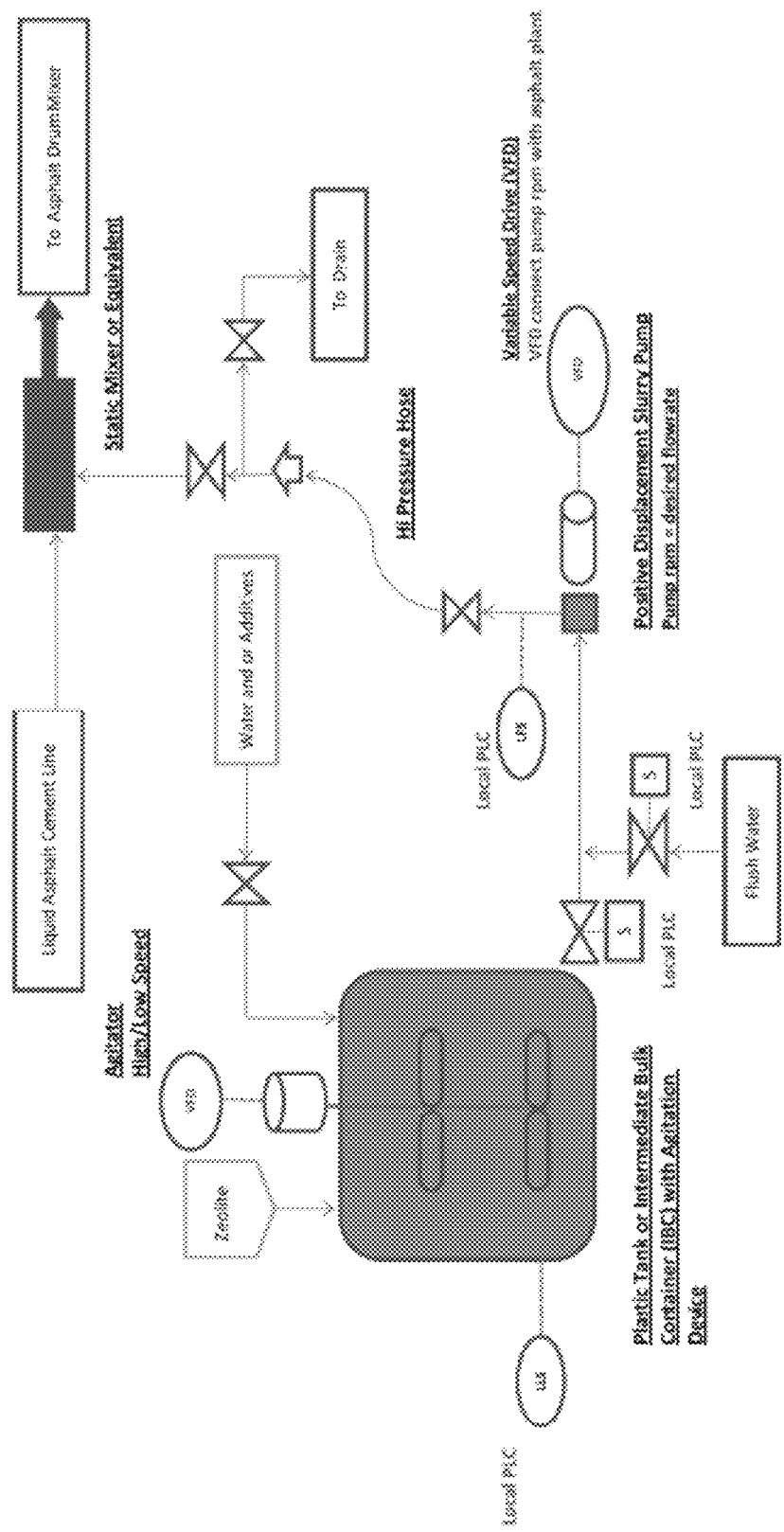
FIG. 1 shows a feed flow chart for introduction of zeolite slurry into an asphalt mix plant.

Embodiments of the invention provide a zeolite and water slurry for addition to asphalt mix. In typical embodiments the zeolite is present at an amount of about 1-70% and the water at 30-99% by weight. In a preferred embodiment zeolite is present between 50-60% and water 40-50%.

A wide variety of zeolites may be used, including natural and artificial zeolites. Typically the zeolites are hydrated. A preferred zeolite is ADVERA® WMA brand hydrated sodium zeolite, which contains about 22% water and 78% hydrated sodium zeolite.

The zeolite and water slurries of the invention may provide a number of benefits over the use of zeolite and water either alone or as separately-added components. For example, the benefits of an amount of zeolite powder will be able to be achieved by addition of a slurry that contains a lower amount of zeolite in the slurry. This will be more cost-effective than zeolite alone. Furthermore, the asphalt mix will have a time released foaming effect that will improve the workability and the paving operation. This will be more effective than water alone.

Although preferred embodiments of the invention may consist essentially of the components water and zeolite, other embodiments may comprise water, zeolite, and one or more additives. For example, the slurry may include a cationic polyamine, such as, for example, the cationic polyamine CALLAWAY C-4030, available from Kemira Chemicals, Inc. Other cationic polyamines useful in embodiments of the invention include, for example, Callaway 4000 Series polyamine, Polymer Research 507, Chemtall 4420, Mid South 9507, Ashland Chemical Amerfloc series, Neo Solutions 3500 series polyamine.

Some embodiments include cationic polyamine at 0.02% of the dry weight of the zeolite included in the slurry. In other embodiments cationic polyamine is present in an amount of from 0.01 up to 0.05% by weight. Although applicants do not wish to be bound by theory, it is believed that the inclusion of a small amount of cationic polyamine additive assists in maintaining the zeolite particles in suspension. The presence of such additive in the slurry composition prevents the formation of skin or hard deposits of the zeolite particles that could lead to performance problems and/or line or equipment plugging with disruptions in the asphalt mix production.

In a further embodiment a portion of the water in the slurry is substituted with a liquid anti-strip composition. Anti-strip additives are designed to enhance asphalt-aggregate adhesion by preventing asphalt from draining from the aggregate in the presence of water. Mitigation of stripping can significantly increase the life of the pavement. Liquid anti-strip compositions may include, for example, polyamines, bishexamethylenetriamine (BHMT), fatty (tallow) amines, amidoamines, and phosphate esters. When liquid anti-strip material is included, a typical slurry includes 1-70% zeolite, 29-59% water, and 1-40% anti-strip by weight. In a preferred embodiment the slurry includes 35-45% zeolite, 25-35% water, and 25-30% anti-strip by weight of the composition.

In a further embodiment, the slurry may include lime. Lime may also serve as an anti-strip composition. When lime is included, a typical slurry includes 10-15% zeolite, 25-50% of water and 40-60% of lime by weight. Preferred embodiments include 10-12% zeolite, 40-50% of water and 40-48% of lime by weight. Because lime is normally added at a rate of 1% of the asphalt mix the addition rate of the slurry would have to be changed when compared to a simple water-zeolite slurry form.

In a further embodiment, the slurry may include an anionic surfactant. For example, two suitable anionic surfactants are MARLIPAL® 13/60 (Sasol) and LUTENSOL® T065 (BASF). Slurries including surfactants generally include 1-70% zeolite, 25-98.5% water, and 0.5% to 5.0% surfactant by weight. Preferred embodiments include 50-60% zeolite, 38-49% water, and 1-2% surfactant by weight.

Those skilled in the art will recognized that two or more of the additives listed separately above may be included in the slurry together. For example, the slurry may include, by weight, 10-12% zeolite, 40-48% lime, 0.1 to 0.5% cationic polyamine, and the balance water. The inclusion of one or more than one of these additives will vary with the performance benefits that are required by the application to which the asphalt mix is expected to be placed.

Those skilled in the art will recognize that zeolite amounts may be varied, in part, based on the amount of water in the hydrated zeolite structure and the water release profile based on temperature. The total amount of slurry used in any particular application may therefore vary based on the amount of water to be released into the asphalt cement. Each type of zeolite will have a different amount of hydration water and a different crystal size. A larger crystal size will allow the water of hydration to be released more quickly. More hydration water will account for more water released from the zeolite structure.

Embodiments of the invention will reduce the production temperature of the asphalt mix into which they are added. Typically the asphalt mix production temperature is reduced by between 10 to 50° C.

In addition to reduction of asphalt mix production temperature, other synergistic effects are anticipated from the slurry. For example, inclusion of the slurry may allow extension of the asphalt cement by about 0.1 to 0.5% of the overall asphalt mix. On the reported example of a laboratory test made with the zeolite slurry a 0.5% reduction of the asphalt cement gave comparable results to a hot mix control. Given the high value of asphalt cement in the cost structure of the asphalt mix this savings may be significant.

In preferred embodiments the slurry is added into an asphalt cement line prior to entering the asphalt mix production drum, by a separate dosing system dedicated for the slurry. Addition of the slurry is typically by positive displacement pump with a variable speed drive. Other pumping devices that provide pressure and a controlled flow rate may also be used. A static mixer is typically provided in the asphalt cement line or in a contact chamber to promote the mixture of asphalt cement and slurry.

The examples below help illustrate a number of possible embodiments of the invention. Of course, the embodiments of the invention are not limited to the examples shown.

EXAMPLES

Figure 2:
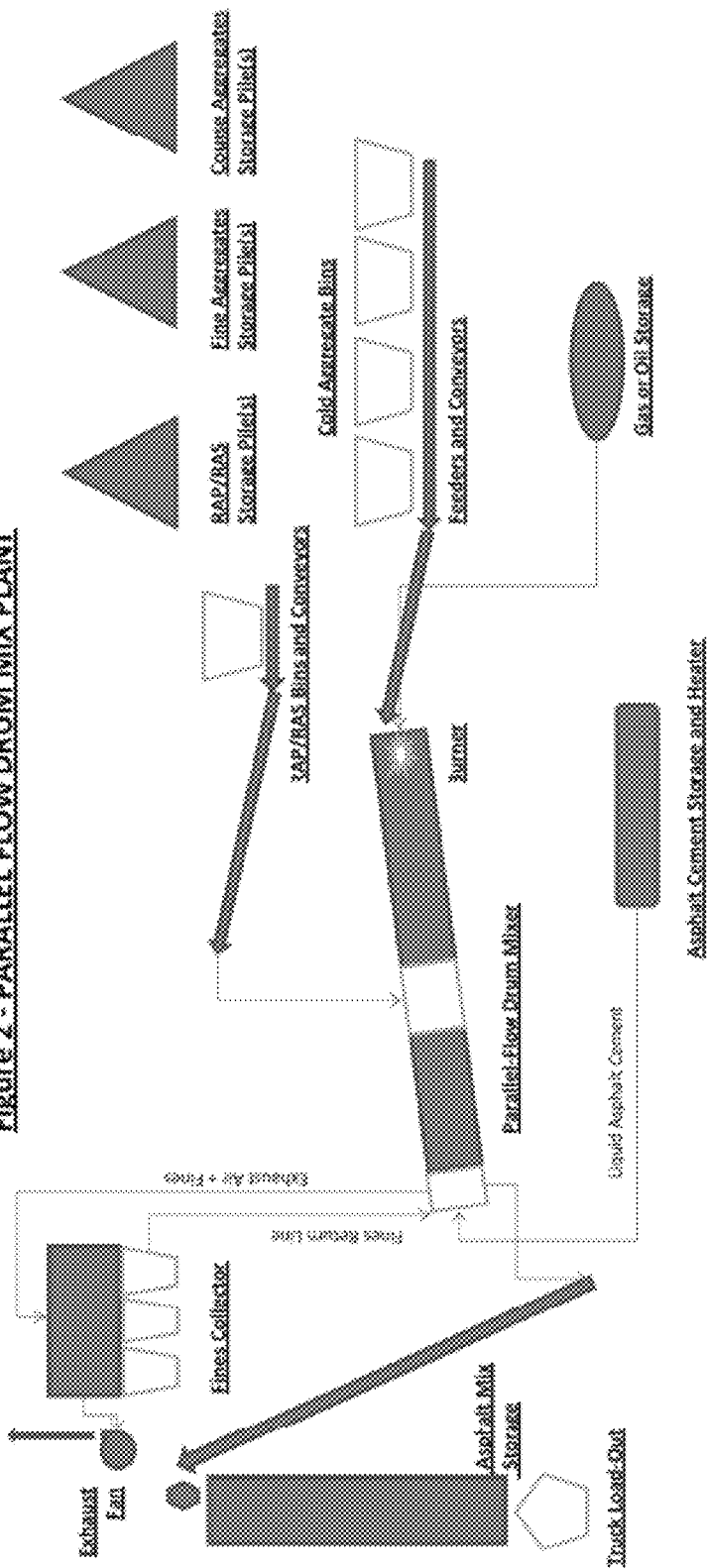
FIG. 2 shows a typical parallel flow drum mix plant.
Figure 3:
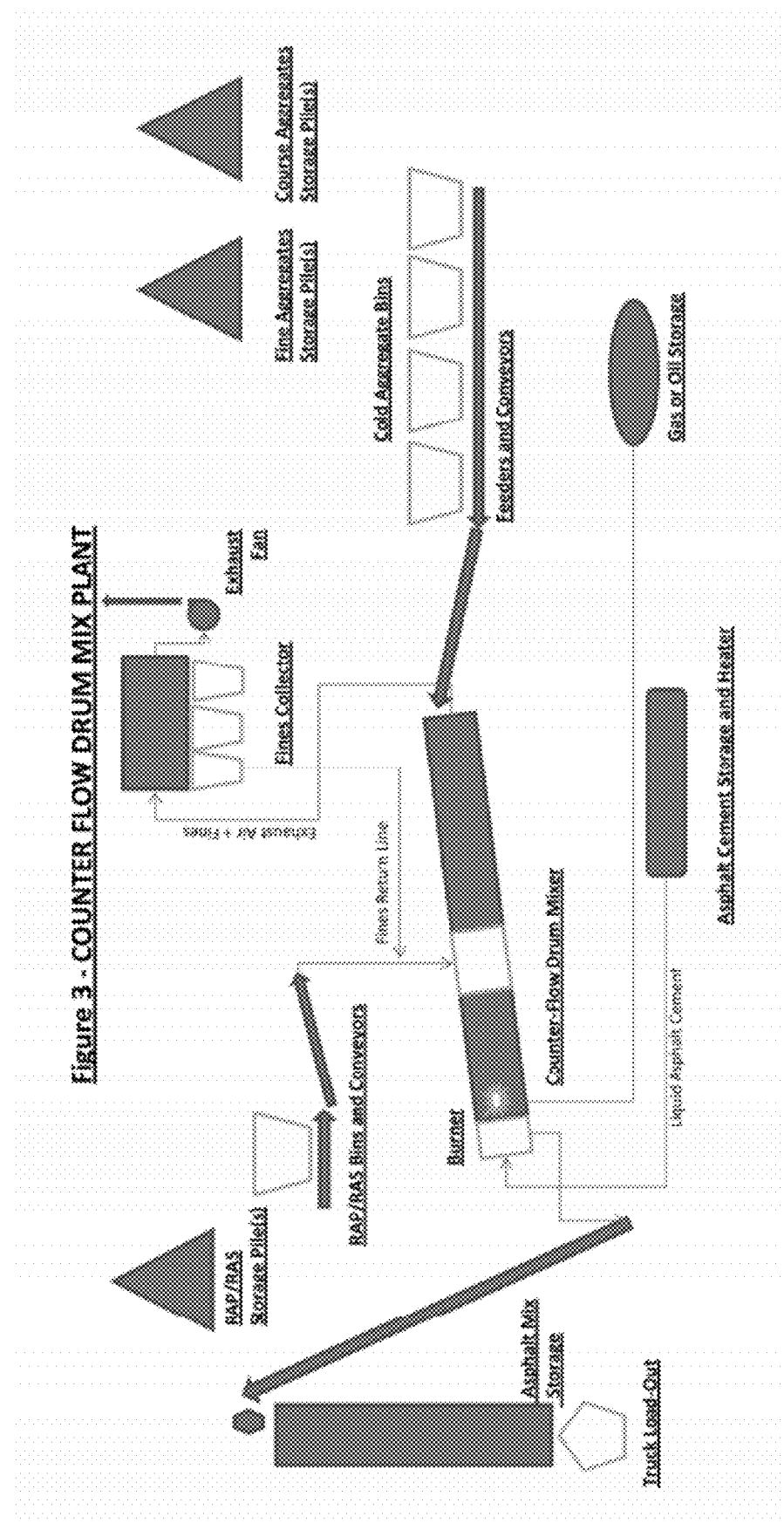
FIG. 3 shows a typical counter flow drum mix plant.

This example describes preparation of asphalt mix using a slurry of the invention in a drum asphalt plant. The process follows the flowcharts presented in FIG. 1 for the additions of the slurry, and in FIG. 2 or 3 for the asphalt mix plant. Aggregates of different gradations are loaded from the stock piles into hopper bins with load cells. According to the mix design to be run each hopper will feed a certain mass flow of a specific aggregate to a belt conveyor that feeds the drum. The drum has hot air travelling in parallel or counter current flow to the aggregate depending on the type of process. The aggregates will dry after travelling approximately ⅔ of the drum, where all the moisture will go to the hot air steam. The hot air is generated with a burner that is located either on the back of the drum or on the front of the drum, depending on the flow pattern.

In the last portion of the drum the aggregates heat up to the mix temperature or above the mix temperature if cold reclaimed asphalt pavement (RAP) and/or recycled asphalt shingles (RAS) are introduced. RAP and RAS are introduced just before the aggregates meet the asphalt cement. The asphalt cement is added in the last part of the drum and the final mix is discharged into the storage silos. The hot air is captured in a baghouse along with the fines from the aggregates. Fines are recycled back to the drum in different locations depending on the type of plant.

The zeolite slurry is prepared by adding the powder into water under constant agitation. Additives, lime, surfactants or liquid anti strips can be added in the end of the process when all the powder has been incorporated and well dispersed into the water. The slurry is pumped to the asphalt plant with a positive displacement pump or any other process equipment or instrument with the ability to control pressure and flow.

With the positive displacement pump the rpm of the motor will give a specific flowrate and therefore a variable speed drive is connected to the pump and the asphalt plant. A fixed rate of slurry per ton of mix or slurry as a percentage of the binder is established to determine the flow to the plant. As a general guideline a 55% zeolite slurry with water will be added at a rate of 0.18% by weight of total asphalt mix. The slurry is mixed with the asphalt cement prior to entering the drum. The mixing can happen on a static mixer or a chamber where the contact of both streams is promoted.

Because of the temperature of the asphalt cement the water in the slurry will immediately be converted to steam bubbles, expanding its volume significantly. The water of the zeolite structure will also start to be released when it sees the high temperature asphalt cement, and the time released effect will happen as long as water remains in the structure and temperature is high enough to release the water.

A further example describes a laboratory evaluation of Zeolite Slurry, Zeolite Powder and Hot Mix Asphalt. Tests conducted by the Department of Civil Engineering of Clemson University (SC) using a South Carolina Department of Transportation (SCDOT) Type C Surface Course mix (Table 1) including a local crushed granite aggregate, a PG64-22 binder, hydrated lime at a rate of 1% by weight of aggregate and Advera WMA (PQ Corporation) powder and slurry.

TABLE 1

Requirements for a SCDOT Surface Type C mix Design

| Sieve | % Passing |
|---|---|
| 19.0 mm | 100 |
| 12.5 mm | 97-100 |
| 9.5 mm | 83-100 |
| 4.75 mm | 58-80 |
| 2.26 mm | 42-62 |
| 0.6 mm | 20-40 |
| 0.15 mm | 8-20 |
| 0.075 mm | 3-9 |
| Gyrations | 50 |
| Binder Limits, % | 5.0-6.8 |
| Binder Grade | PG64-22 |
| Air Voids, % | 3.5-4.5 |
| VMA, % | 15.5% minimum |
| VFA, % | 70-77 |
| D/A Ratio | 0.6-1.2 |

Optimum binder content (OBC) preparations with specimens ranging in binder content from 5.0 to 6.5% and compacted with 50 gyrations in a gyratory compactor.

TABLE 2

Mix Design Results for OBC

| | | Binder Content, % by mixture weight | | | |
|---|---|---|---|---|---|
| | | 5.0 | 5.5 | 6.0 | 6.5 |
| Control (HMA) | Air Voids, % | 6.9 | 7.0 | 4.2 | 2.1 |
| | VMA, % | 17.8 | 19.0 | 17.5 | 16.7 |
| | VFA, % | 61.7 | 62.9 | 76.2 | 88.0 |
| Advera Powder | Air Voids, % | 6.0 | 4.9 | 5.1 | 2.1 |
| | VMA, % | 17.1 | 17.1 | 18.3 | 16.7 |
| | VFA, % | 65.1 | 72.0 | 72.1 | 88.4 |
| Advera Slurry | Air Voids, % | 5.2 | 3.8 | 2.4 | 0.8 |
| | VMA, % | 16.4 | 16.2 | 16.0 | 15.7 |
| | VFA, % | 68.4 | 76.4 | 85.1 | 94.7 |

Figure 4:
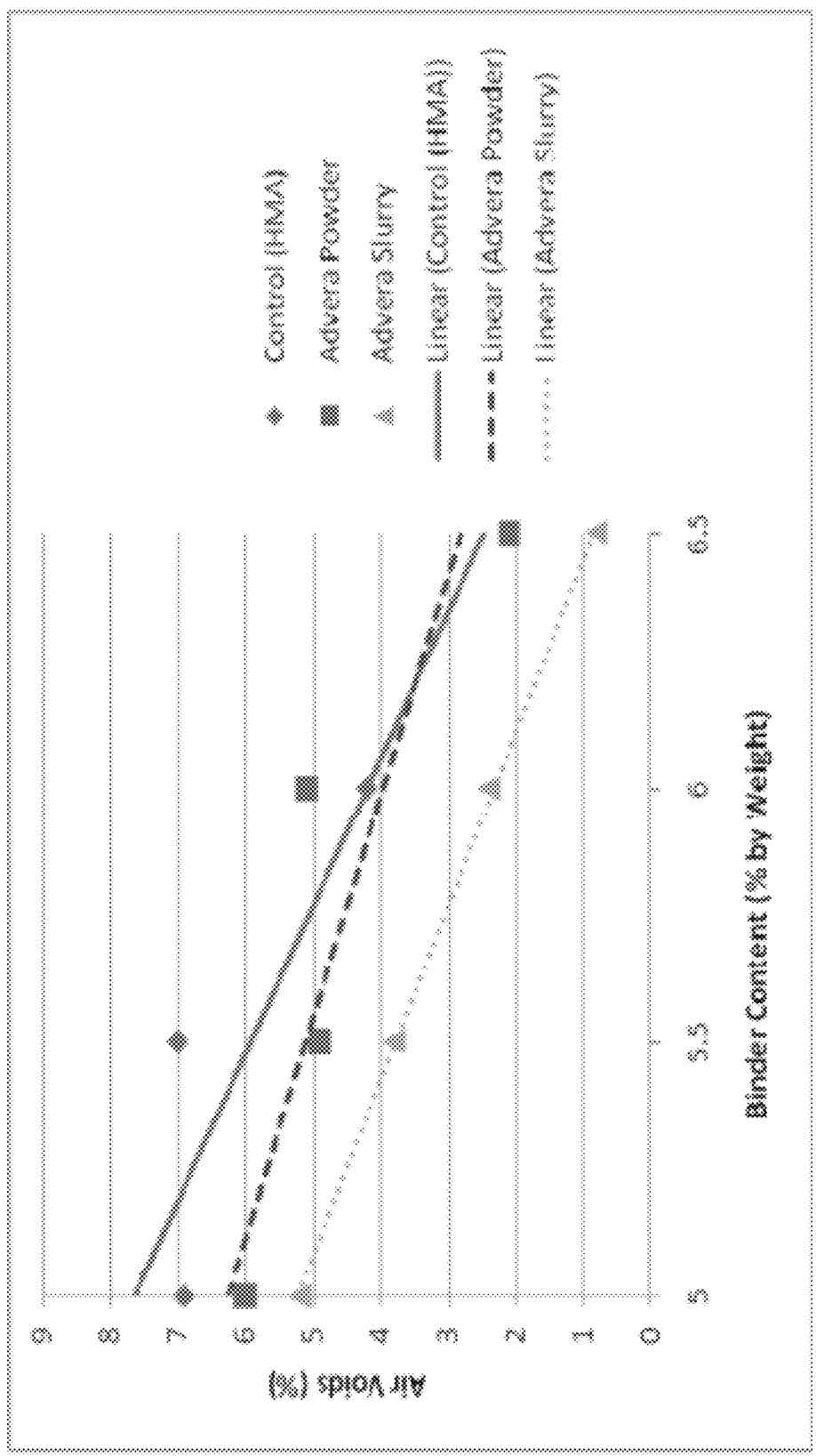
FIG. 4 shows the relationship between air voids and binder content based on the three mix designs in an example below.

FIG. 4 shows optimum Binder Content (OBC) determined as the % binder to achieve a 4% Air Voids in the mix, resulting in 5.5% for ADVERA Slurry, 6.0% for ADVERA Powder and 6.1% for Control (Hot Mix Asphalt).

Mix performance testing specimens were prepared with control mix produced at 152-154° C. and compacted at 140-143° C. and ADVERA Powder/ADVERA Slurry produced at 121° C. and compacted at 115° C. ADVERA powder was added at a rate of 0.25% by weight of total mixture while ADVERA slurry was added at a rate of 0.22% by weight of total mixture.

Resistance to moisture damage was evaluated by comparing the indirect tensile strength of gyratory specimens at the respective optimum binder content that were dry and wet conditioned. The dry specimens were conditioned in air at 25° C. prior to testing. The wet specimens were saturated to a level of 70-80% and then conditioned in 60° C. water for 24 hours followed by 1 hour in 25° C. water prior to testing. The tensile strength ratio was calculated as the ratio of the wet strength to the dry strength. All of the specimens had an air void content of 7+−1%.

The rutting resistance was determined using the Asphalt Pavement Analyzer in accordance with AASHTO TP 63. All of the specimens were prepared at the respective optimum binder content, had an air void content of 7+−1% and were tested at 64° C.

TABLE 3

Summary of Test Results

|   |   | Control (HMA) | ADVERA Powder | ADVERA Slurry |
|---|---|---|---|---|
| Optimum Binder Content, % | | 6.1 | 6.0 | 5.5 |
| Wet | Avg. Air Voids, % | 7.4 | 7.1 | 7.4 |
| ITS | Avg. ITS, k Pa | 691 | 585 | 604 |
| Dry | Avg. Air Voids, % | 7.2 | 7.1 | 7.2 |
| ITS | Avg. ITS, k Pa | 865 | 609 | 703 |
| | TSR, % | 79.8 | 96.1 | 85.9 |
| Rutting | Avg. Air Voids, % | 7.1 | 7.2 | 6.9 |
| | Avg. Rut Depth, mm | 14.6 | 21.8 | 14.2 |

Patents, patent applications, publications, scientific articles, books, web sites, and other documents and materials referenced or mentioned herein are indicative of the levels of skill required for this invention. Inclusion of a document in this specification is not an admission that the document represents prior invention or is prior art for any purpose.

I claim:

1. A slurry for reducing the mix temperature of asphalt cement, comprising:
   water in an amount between 30-99% of the slurry by weight;
   zeolite in an amount between 1-70% by weight; and
   a cationic polyamine.

2. The slurry of claim 1, wherein said water is present between 40-50% by weight and zeolite is present between 50-60% by weight.

3. The slurry of claim 1, wherein said zeolite is at least one member of the group consisting of amicite, analcime, barrerite, bellbergite, bikitaite, boggsite, brewsterite, chabazite, clinoptilolite, cowlesite, dachiardite, edingtonite, epistilbite, erionite, faujasite, ferrierite, garronite, gismondine, gmelinite, gobbinsite, gonnardite, goosecreekite, harmotome, herschelite, heulandite, laumontite, levyne, maricopaite, mazzite, merlinoite, mesolite, montesommaite, mordenite, natrolite, offretite, paranatrolite, paulingite, pentasil (also known as zsm-5), perlialite, phillipsite, pollucite, scolecite, sodium dachiardite, stellerite, stilbite, tetranatrolite, thomsonite, tschernichite, wairakite, wellsite, willhendersonite, yugawaralite, zeolite A, zeolite P, zeolite X, and zeolite Y.

4. The slurry of claim 1, wherein the zeolite is hydrated zeolite sodium A.

5. The slurry of claim 1, wherein the zeolite is a hydrated zeolite.

6. The slurry of claim 1, further comprising a liquid anti-strip composition.

7. The slurry of claim 6, wherein said liquid anti-strip composition is selected from the group consisting of a polyamine, bishexamethylenetriamine (BHMT), a tallow amine, an amidoamine, and a phosphate ester.

8. The slurry of claim 6, wherein said water is present in an amount between 29%-59% by weight, said zeolite is present in an amount between 1%-70% by weight, and said liquid anti-strip composition is present in an amount between 1%-40% by weight.

9. The slurry of claim 8, wherein said water is present in an amount between 25%-35% by weight, said zeolite is present in an amount between 35%-45% by weight, and said liquid anti-strip composition is present in an amount between 25-30% by weight.

10. The slurry of claim 1, further comprising lime in an amount between 40%-60% by weight, water in an amount between 25%-50% by weight, and zeolite in an amount between 10%-15% by weight.

11. The slurry of claim 10, wherein said lime is present in an amount between 40%-48% by weight, water in an amount between 40%-50% by weight, and zeolite in an amount between 10%-12% by weight.

12. The slurry of claim 1, further comprising 0.5%-5.0% surfactant by weight, and wherein said water is present in 25%-98.5% by weight and zeolite present in 1-70% by weight.

13. The slurry of claim 12, wherein said surfactant is present in an amount between 1%-2% by weight, zeolite present between 50%-60% by weight, and water present between 38%-49% by weight.

14. The slurry of claim 1, wherein said cationic polyamine is present in an amount between 0.1%-0.5% by weight.

15. The slurry of claim 10, wherein said lime is present in an amount between 40%-48% by weight, water in an amount between 40%-50% by weight, and zeolite in an amount between 10%-12% by weight.

16. A slurry for reducing the mix temperature of asphalt cement, comprising:
    water in an amount between 30-99% of the slurry by weight;
    zeolite in an amount between 1-70% by weight; and
    a liquid anti-strip composition.

17. The slurry of claim 16, wherein said liquid anti-strip composition is selected from the group consisting of a polyamine, bishexamethylenetriamine (BHMT), a tallow amine, an amidoamine, and a phosphate ester.

18. The slurry of claim 16, wherein said water is present in an amount between 29%-59% by weight, said zeolite is present in an amount between 1%-70% by weight, and said liquid anti-strip composition is present in an amount between 1%-40% by weight.

19. The slurry of claim 18, wherein said water is present in an amount between 25%-35% by weight, said zeolite is present in an amount between 35%-45% by weight, and said liquid anti-strip composition is present in an amount between 25-30% by weight.

20. A slurry for reducing the mix temperature of asphalt cement, comprising:
    water in an amount between 25%-50% of the slurry by weight;
    zeolite in an amount between 10-15% by weight; and
    lime in an amount between 40%-60% by weight.

* * * * *